Figure 2:
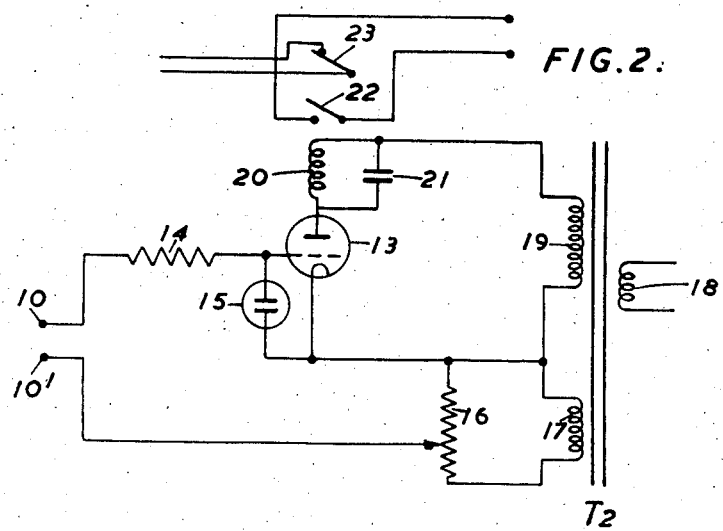

March 28, 1950        A. NEMET        2,502,269
X-RAY CONTROL APPARATUS
Filed March 18, 1946        4 Sheets-Sheet 1
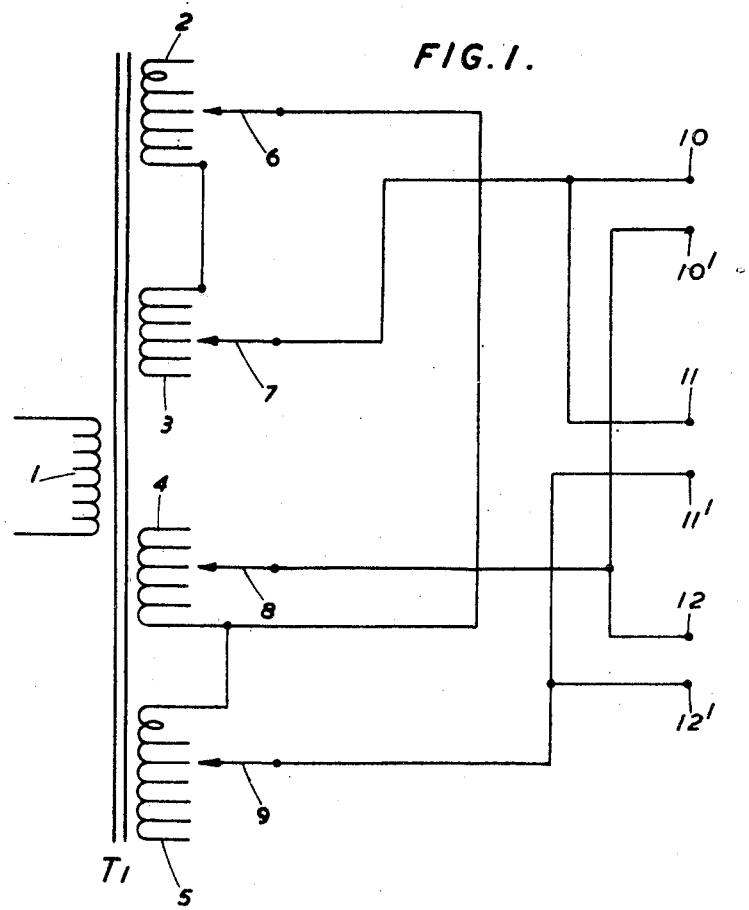
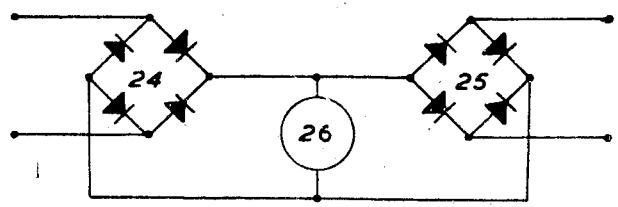
INVENTOR
*ANTHONY NEMET*
BY
ATTORNEY.

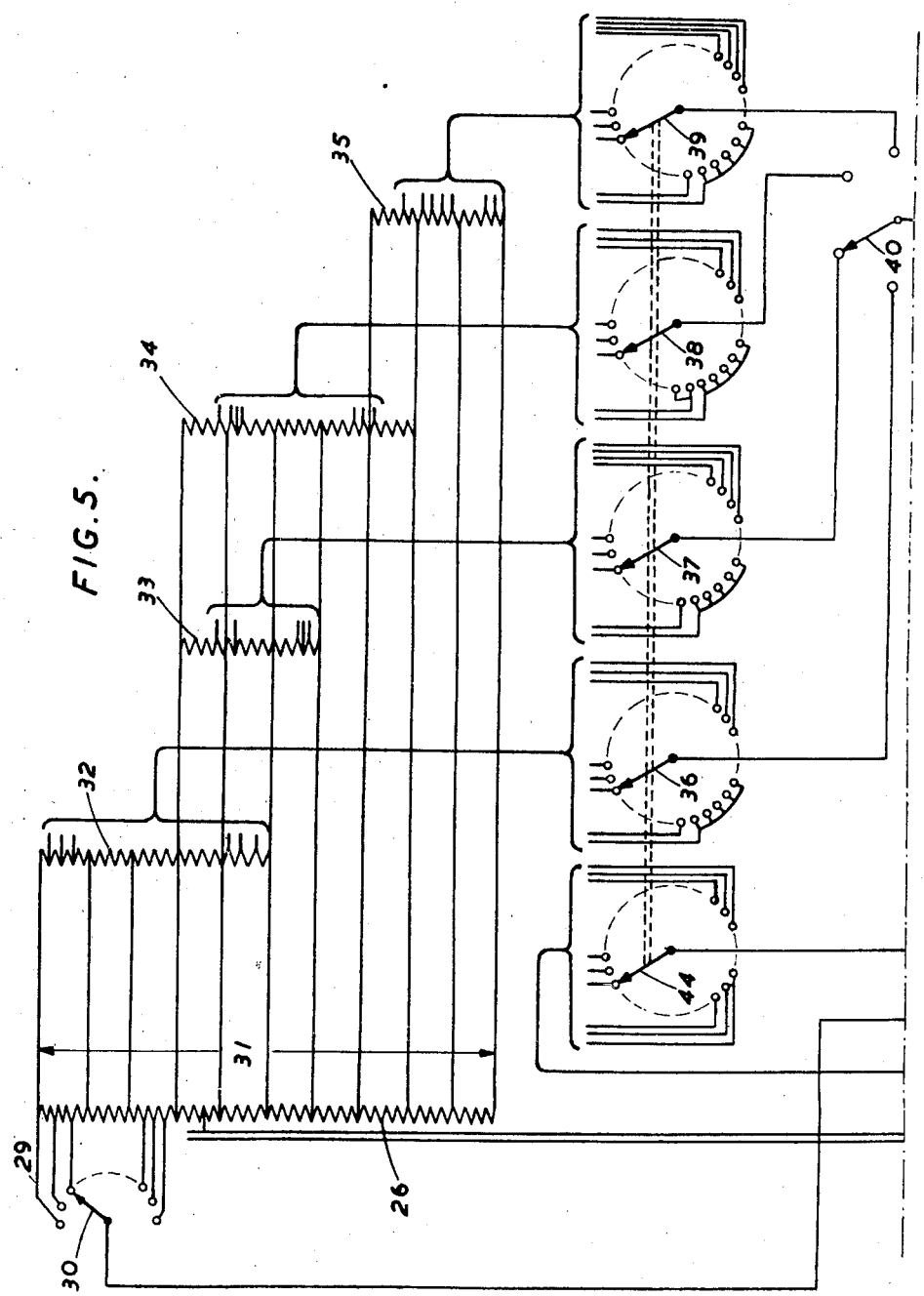

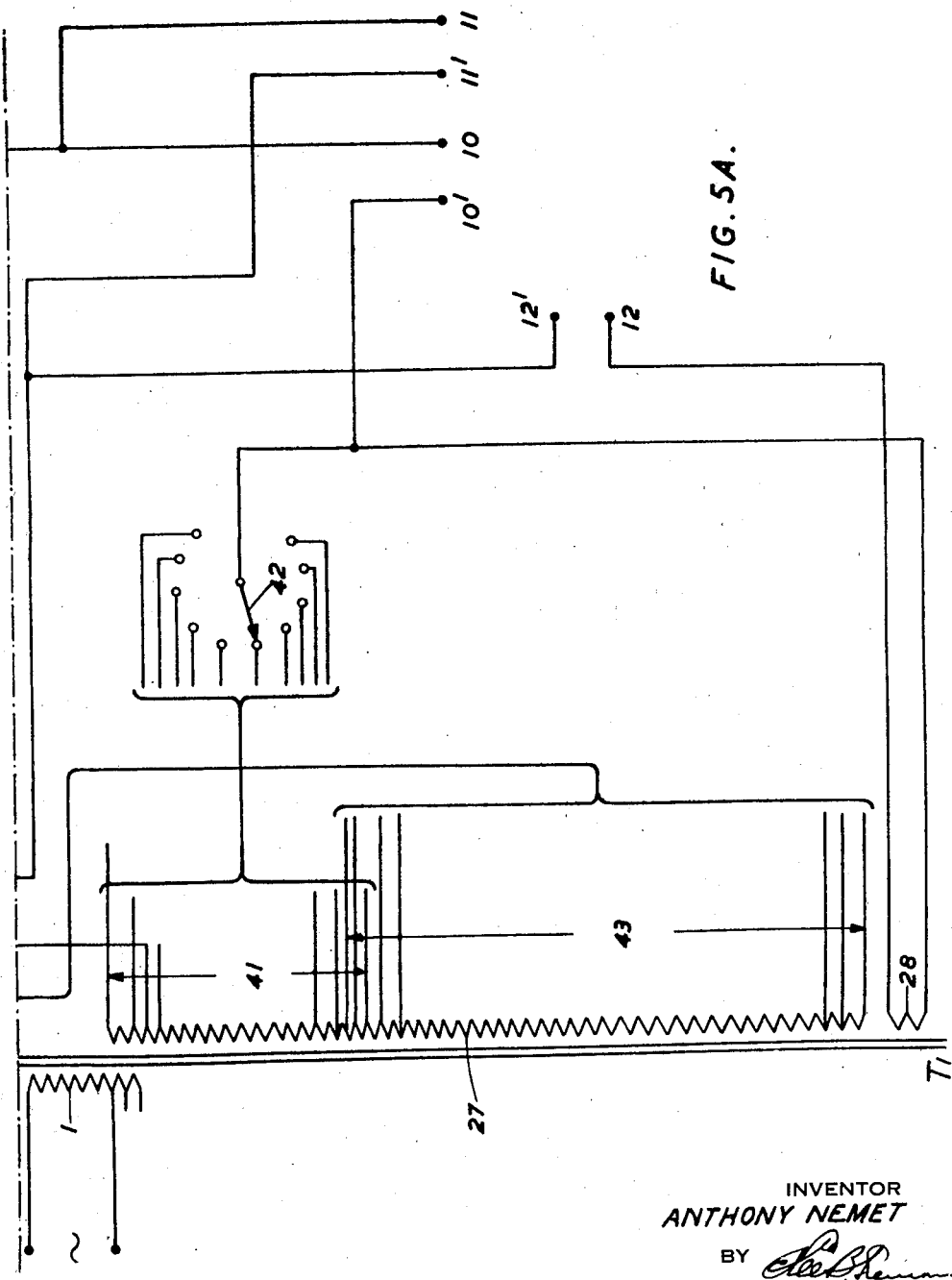

Patented Mar. 28, 1950

2,502,269

UNITED STATES PATENT OFFICE 2,502,269

X-RAY CONTROL APPARATUS

Anthony Nemet, London, England, assignor to Philips Lamps Limited, London, England, a British company Application March 18, 1946, Serial No. 655,337 In Great Britain December 21, 1944

Section 1, Public Law 690, August 8, 1946
Patent expires December 21, 1964

5 Claims. (Cl. 250—95)

This invention relates to X-ray control apparatus and is concerned more particularly with the provision of improved automatic overload protection and indication.

X-ray control apparatus usually contains independent controls for the three main variables, i. e. kilovoltage, milliamperage and exposure time. These controls mostly work with the aid of an auto-transformer, filament heating control and a time-switch respectively. In addition to these, large X-ray apparatus is often built to supply several types of X-ray tubes, and a special control is then provided to change over from one tube to another. The three main variables are correlated in the so-called tube charts provided with every type of X-ray tube. If two variables are given or selected independently, then by reference to these charts it is possible to read off the predetermined maximum which the third variable may not exceed without damage to the X-ray tube. A completely flexible control would allow all combinations of the three variables within the limits of the rating chart to be selected and prevent the use of any combination outside it. The object of the present invention is to achieve this in a comparatively simple way.

A further object of the invention is to incorporate an indicating system in such a way that a measuring instrument gives a visual indication whether the rating is exceeded or not, and how near the maximum rating is approached. It will be apparent that if the meter is calibrated in milliampere seconds, the readings are a measure of the X-ray exposure.

The invention is based on the fact that there is a definite relationship between the wattage applied to the X-ray tube and the maximum permissible exposure time. This relationship is, in fact, one expression of the rating chart mentioned above. Accordingly it is immaterial whether the given wattage is obtained by a high milliampereage and low kilovoltage or vice versa, as long as the product remains the same.

According to the present invention the setting of the main controls for time, kv. and ma. is caused to set auxiliary means giving rise to voltages which are proportional to the logarithm of the value of the wattage permissible in accordance with the selected exposure time, the logarithm of the value of the selected kv., and the logarithm of the value of the selected ma., and these voltages are equated to determine whether or not the watage corresponding to the selected kv. and ma. is less than the maximum tolerable wattage for the selected exposure time, the resultant of the equating operation being applied to means controlling the operation of the X-ray tube so as to permit operation only within the tolerable loading of the tube.

The equating operation is conveniently performed by first subtracting the voltage corresponding to the logarithm of the selected kv. from the voltage corresponding to the logarithm of the maximum permissible wattage, and thereafter applying the difference voltage and the voltage corresponding to the logarithm of the selected ma. in opposition to the means controlling the operation of the X-ray tube.

In order that the invention may be more readily understood and carried into effect, reference will now be had to the accompanying drawings, in which—

Figure 4:
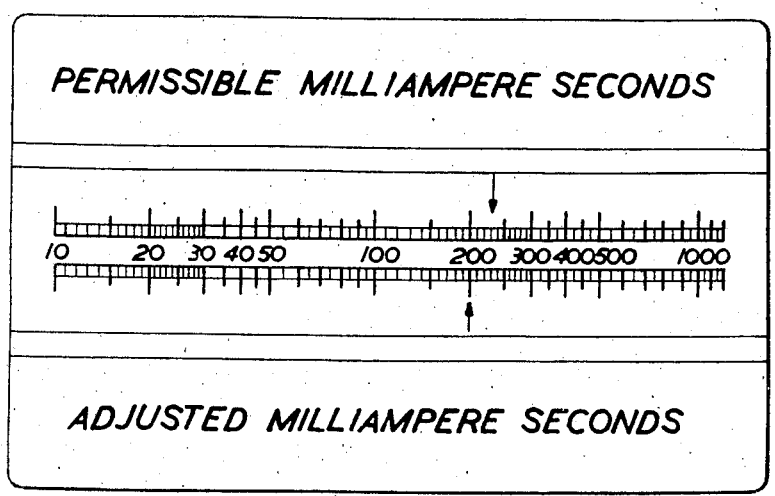

Figure 1 is a circuit diagram illustrating the manner in which the voltages are derived and equated, Figure 2 is a circuit diagram of the relay circuit serving as overload protection, Figure 3 is a circuit diagram showing a preferred meter connection, Figure 4 shows the preferred arrangement of the scales of the multi-ampere seconds meter.

Figures 5 and 5a jointly constitute a circuit diagram showing the embodiment of the invention in a control arrangement for an X-ray installation comprising a plurailty of X-ray tubes and a focus-selector switch.

Referring first to Figure 1, a small auxiliary transformer T, has its primary winding 1 supplied with A. C., preferably from the stabilised A. C. supply which is usually provided in X-ray apparatus. The transformer T, has four secondary windings 2, 3, 4, 5, of which 2 and 3, and 4 and 5 respectively are connected in series. Each secondary winding 2, 3, 4, 5 is provided with a series of tappings, which are selected by switch arms 6, 7, 8 and 9 respectively constituting repeating decks for the main kv. switch, the time switch, the ma. switch and the time swtich respectively. The switch arm 6 is connected to the junction point of the windings 4 and 5, and the other switch arms are each connected to two terminals of three pairs of terminals 10, 10', 11, 11' and 12, 12'. The switch arm 7 is connected to the terminals 10, 11, the switch arm 8 to the terminals 10', 12, and the switch arm 9 to the terminals 11', 12'. It will be noted that both switch arms 7 and 9 constitute repeating decks for the main time switch.

The tappings on the coil 2 are so arranged that with the arm 6 repeating the setting of the kv. control switch, the voltage tapped off by the arm 6 is proportional to the logarithm of the kv. value set by the kv. control. The tappings on the coil 3 are so arranged that with the arm 7 repeating the setting of the time switch, the voltage tapped off by the arm 7 is proportional to the logarithm of the maximum kilowattage with which the X-ray tube can be loaded corresponding to the selected exposure time. As explained above, for a given tube, there is a definite relationship between maximum kilowattage and exposure time. The tappings on the coil 4 are so arranged that with the arm 8 repeating the setting of the ma. control switch, the arm 8 taps off a voltage proportional to the logarithm of the value of the ma. as adjusted by the ma. control switch. The tappings on the coil 5 are so arranged that with the arm 9 repeating the setting of the time switch, the voltage tapped off by the arm 9 is proportional to the logarithm of the selected exposure time. The range of voltage necessary for the series of tappings for either of the four quantities kv., kw., ma. and seconds selected is proportional to the logarithm of the ratio of the maximum and minimum values of that quantity.

The difference of the voltages tapped off the coils 2 and 3 is proportional to the logarithm kw. minus the logarithm kv., and so is proportional to the logarithm of the maximum permissible tube milliamperage (log. ma. per.); from this difference voltage is subtracted the voltage proportional to the logarithm of adjusted ma. (log. ma. adj.), and the difference of the two appearing at the terminals 10, 10′ is proportional to log. ma. per. minus log. ma. adj. Hence the voltage at 10, 10′ falls to zero and then changes phase by 180° when the difference between the permissible milliamps and adjusted milliamps changes sign. This phase change is utilised in a way to be described later to make the X-ray set inoperable when the adjusted ma. exceeds the permissible ma.

Provision is also made for indicating the permissible and adjusted exposures in ma. s. (ma. s. per. and ma. s. adj.). To the voltage proportional to log. ma. per. derived as described above from the voltages tapped off by the arms 6 and 7 on the coils 2 and 3 is added a voltage of the same phase proportional to the logarithm of exposure time (logarithm S) as tapped off by the arm 9 on the coil 5 giving at the terminals 11, 11′ a resultant voltage proportional to log. ma. s. per. Similarly, a voltage proportional to log. ma. s. adj. obtained by the addition of the voltages tapped off by the arms 8 and 9 on the coils 4 and 5 is produced at the terminals 12, 12′.

The relay circuit controlled by the voltage at the terminals 10, 10′ (Figure 1) to serve as overload protection will now be described with reference to Figure 2. The voltage produced at terminals 10, 10′ (Figure 1) is applied at the corresponding terminals 10, 10′ (Figure 2) between the grid and cathode of the valve 13. A current limiting resistance 14 is placed in the grid lead and a neon tube 15 serves as voltage limiting device preventing the valve 13 from being damaged by an excessive negative grid voltage. A small grid biassing A. C. voltage is supplied to the grid by the potentiometer 16 which is fed by the secondary winding 17 of a transformer T2 the primary 18 of which is connected to a suitable source of A. C., preferably the stabilised A. C. as supplied to the primary 1 of the transformer T1. The valve anode is fed with unrectified A. C. voltage by the secondary winding 19 of the transformer T2 via the relay coil 20 which is shunted by the condenser 21 to prevent chattering. Associated with the relay coil 20 are normally open contacts 22 which are connected in series with the usual energising coil of the exposure relay (not shown). The voltage applied to the anode is arranged to be in phase with the voltage applied to the grid when the permissible ma. is greater than the adjusted ma., and when this condition occurs the valve will pass current which energises the relay coil 20, closes the contacts 22 and allows an exposure to be made. When, however, the adjusted ma. exceeds the permissible ma., the grid and anode voltages are 180° out of phase, the relay coil 20 will not be energised the contacts 22 remain open and so no exposure can be made. A pair of normally closed contacts 23 also associated with the relay coil 20 can be used to operate a signal light to indicate this condition.

It is therefore apparent that with a circuit arrangement in accordance with Figure 1 associated with a relay circuit in accordance with Figure 2, operation of the X-ray unit is prevented if the selected settings of the kv., ma. and time controls are such as would lead to overload if the X-ray tube were operated under such conditions. In addition to preventing overload, the relay circuit as described also gives a visual indication as to whether or not the selected settings of the controls represent a permissible combination. Moreover, the circuit arrangement of Figure 1 gives at the pairs of terminals 11, 11′ and 12, 12′ voltages which can be applied to meters showing the maximum permissible ma. s. and the adjusted ma. s. respectively.

The ma. s. values can be indicated by rectifier type moving coil instruments, conveniently on a logarithmic scale. It is at once seen that the range of voltages that may appear across the pairs of terminals 11, 11′ and 12, 12′ when all possible settings of the three separate controls for kv., ma. and time are considered, is far in excess of that which has practical importance in medical radiology. Therefore, to make full use of the deflection range of the instruments, these may be biassed by a constant negative torque. This may be produced by either a differential rectifying circuit or by a bias on the hair spring (set up zero), or by two coils on the same movement, one of which carries the biassing current. A practical range of ma. s. is, for example, 10 to 1200.

Figure 3 shows a suitable arrangement of differential rectifying circuit for use with the meters for ma. s. adj. and ma. s. per. respectively. The variable A. C. voltage derived from the pair of terminals 11, 11′ or 12, 12′ (Figure 1) is applied to a rectifier unit 24 and a constant A. C. voltage to provide the constant bias is applied to a rectifier unit 25, the outputs of the rectifiers 24, 25 being connected differentially to the meter 26. The constant A. C. voltage may be derived from the stabilised A. C. used to supply the primary windings of the transformers T1 and T2 (Figures 1 and 2).

According to a special feature of the invention the two meters measuring permissible ma. s. and adjusted ma. s. respectively, are incorporated in a single case, the dials of the meters being on the same scale and arranged in juxtaposition, so that the relative values as well as the absolute values can be seen directly. A convenient meter dial arrangement comprises a double scale similar to that shown in Figure 4. In this figure, the upper scale cooperates with the indicator of the meter responsive to the voltage proportional to the logarithm of the permissible milliampere seconds, whereas the lower scale cooperates with the indicator of the meter responsive to the voltage proportional to the logarithm of the adjusted milliampere seconds. The relative position of the two pointers will show whether the adjusted ma. s. or the maximum permissible ma. s. value is greater, and thus whether the adjustments are within the rating of the X-ray tube or not. It will also show how closely the maximum permissible rating is approached and thus be a convenient guide for the control of the X-ray apparatus.

It is obvious that in addition to (or instead of) the above-described indicating system a meter calibrated in terms of "percentage load" or "load factor" could be incorporated in the X-ray control apparatus. This meter would have a position marked "100%" or "1," which would correspond to full load on any combination of the X-ray controls. This meter would be supplied by the voltage which appears at the terminals 10, 10'' (Figure 1) and which is applied to the grid of the overload protecting valve 13 (Figure 2). If this voltage is passed through a suitable rectification system, it can be arranged that it becomes zero for 100% load. It would assume a negative sign, for instance, if the load is within the permissible rating, and it would change its sign for any combination of the X-ray controls which would lead to overloading the X-ray tube.

The application of the present invention to X-ray apparatus comprising a plurality of X-ray tubes which are used selectively, a so-called focus selector switch being provided for switching from one tube to another, will now be described with reference to Figure 5. In such apparatus it is preferable not to tap the logarithm of the maximum permissible kilowatts directly from the transformer coil (coil 3 of transformer T₁, Figure 1) but to provide potentiometers which are supplied with a constant voltage from tappings on the transformer coil, and to tap off the logarithmic values from these potentiometers. One potentiometer is provided to correspond with each X-ray tube, and the appropriate potentiometer is selected and switched into circuit by the focus selector switch.

In Figures 5 and 5a, the transformer T₁, which corresponds to the transformer T₁ in Figure 1, is provided with a primary winding 1 and three secondary windings 26, 27 and 28. The secondary winding 26 serves to provide the tappings necessary for the kv. and kw. selections respectively and thus fulfils the functions of the coils 2 and 3 in Figure 1. Similarly the winding 27 fulfils the functions of the coils 4 and 5 in Figure 1 in that it provides the tappings necessary for the ma. and time selections respectively. The winding 28 is an auxiliary winding which enables the use of the same series of time tappings for both the ma. s. meter circuits.

The winding 26 has a series of tappings 29 with which cooperates a switch arm 30 constituting a repeating deck of the main kv. selector. The tappings 29 and arm 30 serve the same purpose as the tapped coil 2 and the arm 6 in Figure 1, and accordingly no further description is necessary.

The winding 26 has a further series of tappings 31 which are connected to a number of potentiometers 32, 33, 34, 35, each corresponding to a different tube focus. Each potentiometer is preferably connected to the winding 26 at several points by the tappings 31 so as to reduce the voltage drop caused by the current taken by the meter showing permissible ma. s. Each potentiometer 32, 33, 34, 35 is provided with the requisite tappings which are selected by switch arms 36, 37, 38, 39 respectively. These switch arms constitute repeater decks of the main time switch. Consequently, each set of tappings and the associated switch arm serve the function of the tapped winding 3 and switch arm 7 in the arrangement of Figure 1, which has already been fully described. Leads from the switch arms 36, 37, 38, 39 are connected to the separate terminals of a selector switch, the switch arm 40 of which is coupled with the focus selector switch so that on selecting a given X-ray tube the corresponding potentiometer is included in the control circuit. In the setting shown the potentiometer 33 is operative. The arm 40 of the selector switch is connected to the terminals 10 and 11.

The winding 27 is provided with two sets of tappings and serves the function of the two coils 8 and 9 in Figure 1. One set of tappings 41 is taken to the repeating deck of the ma. selector where the switch arm 42 (corresponding to the arm 8, Figure 1) makes the selection and provides a connection to the terminals 10' and 12, the latter connection being by way of the auxiliary secondary winding 28 which provides a constant A. C. bias serving as scale correction for the voltage obtained at the terminals 12, 12'.

The other set of tappings 43 on the winding 27 is taken to a further repeating deck of the time switch where the selection is made by the switch arm 44 (corresponding to the arm 9, Figure 1). The arm 44 is connected to the terminals 11' and 12''.

By analogy with the circuit arrangement already described with reference to Figure 1, it is apparent that in the control circuit of Figure 3 as applied to a focus selector installation, the voltage at the terminals 10, 10' is the difference between the log. ma. per. and log. ma. adj. This difference voltage is applied to the relay circuit controlling the actual operation of the selected X-ray tube, preferably a relay circuit as described with reference to Figure 2.

Similarly in Figure 3, the voltage at the terminals 11, 11' is proportional to log. ma. s. per., and that at the terminals 12, 12' is proportional to log. ma. s. adj. These voltages are applied to ma. s. meters, preferably as hereinbefore described with reference to Figures 3 and 4.

I claim:

1. X-ray control apparatus comprising means for obtaining a first potential proportional to the logarithm of the maximum permissible power input to an X-ray tube for a selected exposure time of the tube, means for obtaining a second potential proportional to the logarithm of the voltage applied to the X-ray tube, means to obtain a third potential proportional to the logarithm of the current flowing through the X-ray tube, means to subtract said second and third potentials from said first potential to produce a resultant potential, an electron discharge device having a cathode electrode, a control electrode, and an anode electrode, a circuit arrangement for energizing said anode electrode including a current responsive member for controlling the operation of the X-ray tube, and means for applying said resultant potential to said control electrode to actuate said current responsive member.

2. X-ray control apparatus for an X-ray installation for a plurality of X-ray tubes, comprising a first transformer winding portion, a plurality of potentiometers coupled to said winding each producing a first potential proportional to the logarithm of the maximum permissible power input of one of said tubes, means to couple in circuit one of said potentiometers corresponding to one of said tubes in operation, means for producing a second potential proportional to the logarithm of the voltage applied to the tube, means to produce a third potential proportional to the logarithm of the current flowing through the tube, means to subtract said second and third potentials from said first potential derived from said selected potentiometer to produce a resultant potential, and means responsive to said resultant potential for controlling the operation of said tube.

3. X-ray control apparatus comprising means for producing a first potential proportional to the logarithm of the maximum permissible power input to an X-ray tube for a selected exposure time of the X-ray tube, means for producing a second potential proportional to the voltage applied to the X-ray tube, means for producing a third potential proportional to the current flowing through the X-ray tube, means for producing a fourth potential proportional to the selected exposure time of the X-ray tube, means to subtract said second and third potentials from said first potential to obtain a first resultant potential, means responsive to said resultant potential for controlling the operation of the X-ray tube, means to subtract said second potential from said first potential to obtain a second resultant potential, means to add said fourth potential to said second resultant potential to produce a third resultant potential proportional to the product of the maximum permissible current for the tube and the selected exposure time, and indicating means for measuring said third resultant potential to indicate the product of the maximum permissible current for the tube and the selected exposure time.

4. X-ray control apparatus comprising means for producing a first potential proportional to the logarithm of the maximum permissible power input to an X-ray tube for a selected exposure time of the X-ray tube, means for producing a second potential proportional to the logarithm of the voltage applied to the X-ray tube, means for producing a third potential proportional to the logarithm of the current flowing through the X-ray tube, means for producing a fourth potential proportional to the logarithm of the selected exposure time for the X-ray tube, means to subtract said second and third potentials from said first potential to obtain a resultant potential, means responsive to said resultant potential for controlling the operation of the X-ray tube, means to add said third and fourth potentials to obtain a second resultant potential proportional to the product of the current flowing through the X-ray tube and the selected exposure time for the tube, and indicating means for measuring said second resultant potential as the product of the current flowing through the tube and the selected exposure time for said tube.

5. X-ray control apparatus comprising means for producing a first potential proportional to the logarithm of the maximum permissible power input to the tube for a selected exposure time of the tube, means to produce a second potential proportional to the logarithm of the voltage applied to the tube, means to produce a third potential proportional to the logarithm of the current flowing through the tube, means for producing a fourth potential proportional to the logarithm of the selected exposure time for the tube, means to substract said second and third potentials from said first potential to obtain a first resultant potential, means responsive to said first resultant potential for controlling the operation of the tube, means for subtracting said second potential from said first potential to obtain a second resultant potential, means to add said fourth potential to said second resultant potential to produce a third resultant potential proportional to the product of the maximum permissible current for the tube and the selected exposure time of the tube, means for adding said third and fourth potentials to obtain a fourth resultant potential proportional to the product of the current flowing through the X-ray tube and the selected exposure time for the tube, and indicating means for measuring said third and fourth resultant potentials comprising a meter having two scales calibrated to indicate the product of the maximum permissible current for the tube and the selected exposure time of the tube and the product of the current flowing through the tube and the selected exposure time of the tube respectively.

ANTHONY NEMET.

REFERENCES CITED

The following references are of record in the file of this patent:

UNITED STATES PATENTS

| Number | Name | Date |
|---|---|---|
| 2,114,330 | Borden | Apr. 19, 1938 |
| 2,224,369 | Martin | June 3, 1941 |
| 2,319,322 | Hefel | May 18, 1943 |
| 2,339,902 | Akers et al. | Jan. 25, 1944 |
| 2,351,486 | Constable et al. | June 13, 1944 |
| 2,365,554 | Jeans | Dec. 19, 1944 |
| 2,368,798 | Ball | Feb. 6, 1945 |
| 2,379,125 | Weisglass | June 26, 1945 |